April 23, 1968 W. KAMINSKI 3,379,897

FREQUENCY DIVISION BY SEQUENTIAL COUNTDOWN OF PARALLELED CHAIN COUNTERS

Filed April 22, 1965 4 Sheets-Sheet 1

INVENTOR
W. KAMINSKI
BY
John K. Mullarney
ATTORNEY

United States Patent Office 3,379,897

Patented Apr. 23, 1968

3,379,897

FREQUENCY DIVISION BY SEQUENTIAL COUNTDOWN OF PARALLELED CHAIN COUNTERS

William Kaminski, West Portal, N.J., assignor to Bell Telephone Laboratories, Incorporated, New York, N.Y., a corporation of New York Filed Apr. 22, 1965, Ser. No. 450,120

4 Claims. (Cl. 307—225)

ABSTRACT OF THE DISCLOSURE

A frequency dividing system sequentially energizes a plurality of cascaded frequency divider chains comprising relaxation type frequency dividers to obtain an over-all divisor ratio equalling the sum of the individual divisor ratios of each of the cascaded frequency divider chains. Each individual cascaded frequency divider chain is enabled or inhibited by the application of an energizing or inhibiting signal to each relaxation type frequency divider in the chain. The energizing and inhibiting signals are supplied by a multistate circuit responsive to the frequency divided output of the individual cascaded frequency divider chains.

This invention relates to frequency dividers and, more particularly, to frequency dividers having large arbitrary division ratios.

The prior art frequency dividers have generally taken the form of cascaded chains of binary counters, or cascaded chains of relaxation type dividers. The use of successive binary counters to obtain a large divisor for frequency division is well known. However, the over-all divisor that is generated is usually restricted so as to consist of the factors of each stage. For example, if a division ratio of 100 is desired a frequency divider chain may consist of division ratios or factors of 5:5:4. Now if a division ratio of 101 is needed the designer has been forced to use binary counter chains incorporating pulse feedback loops of varying degrees of complexity and reliability. For example, to achieve a large prime number division with a chain of binary counters, it is common practice to use pulse feedback circuits utilizing logic circuitry and delay lines. These arrangements are usually expensive, they are difficult to design, and they permit no flexibility in the selection of different division ratios once a circuit is designed for a particular ratio.

Relaxation type frequency dividers, on the other hand, may be adjusted to achieve prime number divisors by simply changing the time constant of the timing circuit. However, individual relaxation type divider circuits are limited to division ratios generally no greater than 11, because of operating limitations including the danger of false triggering. To achieve a large number division ratio, relaxation type dividers must be cascaded in a chain. However, conventional pulse feedback arrangements cannot be effectively utilized here, as in the case of the binary counter, because the pulse input to a relaxation type divider merely serves to synchronize its operation and must be introduced at a critical period just before the timing capacitor of the individual relaxation divider circuit has discharged. Accordingly, in the past, cascaded chains of relaxation type dividers have been limited to integral multiples of the individual division factors of the individual stages.

It is, therefore, an object of the present invention to achieve arbitrary, large number, division ratios including prime numbers.

It is another object of the present invention to achieve variable large number division ratios with minimum circuit complexity.

It is still another object of the present invention to achieve a long output period of countdown timing without unduly long time constants required in the individual units of relaxation type frequency dividers.

It is yet another object to achieve a large number of frequency division ratios which may be easily selected or adjusted in a single circuit design without resorting to changes in the circuit design.

In accordance with the present invention, multiple chains of cascaded relaxation type frequency dividers are connected in parallel. A pulse train of frequency F, which is to be reduced by some factor K, is applied simultaneously to the input of each of the chains of cascaded dividers. Each of the chains has its own frequency division ratio $N_1, N_2 \ldots N_n$. The outputs of the respective divider chains are applied to a logical multistate memory device, such as a flip-flop or a shift register. Respective outputs of the memory device are in turn fed back to respective cascaded chains in a manner such that one and only one chain of dividers is enabled at a time. Upon the completion of the count in one cascaded frequency divider chain, the state of the memory device is altered and the count then proceeds in the next succeeding chain, and so on until a full cycle of operation is completed. The total frequency division ratio is thus the sum of the division ratios of the respective cascaded chains, i.e., $$K=N_1+N_2+ \ldots N_n$$

where N can be any integer from 1 on.

A feature of the present invention is the ability to achieve very large, yet arbitrary, division ratios by using a large number of paralleled frequency divider chains controlled by a multistate memory circuit (e.g., a shift register) having an equivalent large number of individual stages. A very large division ratio equal to the sum of the division ratios of the individual chains is thereby achieved.

An added feature of the present invention is that a conventional logic circuit can be incorporated into the above-recited circuitry in a manner such as to achieve a division ratio in accordance with the following algorithm: $K=N_1 \cdot N_2+N_3$, where $N_1$, $N_2$, $N_3$ comprise the division ratios of three distinct cascaded divider chains. This technique, to be described in detail hereinafter, permits the use of much shorter counting chains with a concomitant increase in count reliability.

Other objects and various features and advantages of the invention will become readily apparent from the following detailed description when considered in connection with the accompanying drawings in which.

Figure 1:
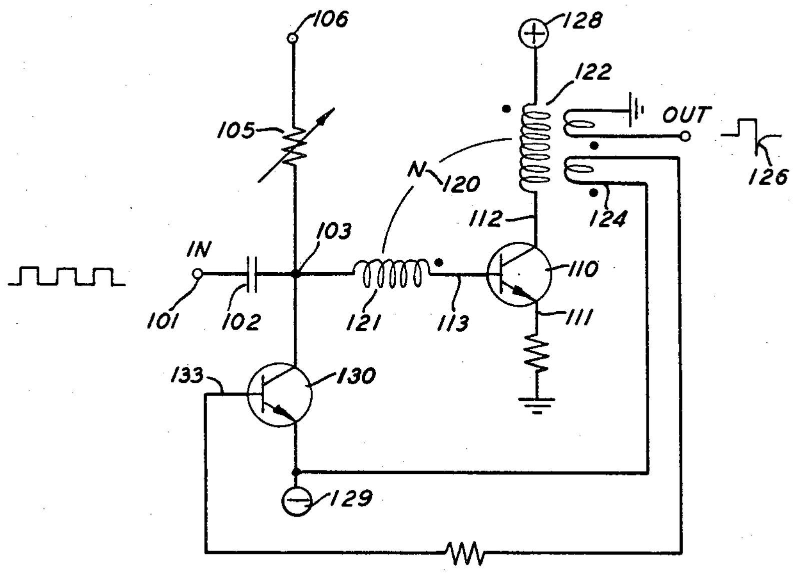
FIG. 1 is a schematic circuit diagram of a relaxation type frequency divider suitable for use in a chain of cascaded frequency dividers.

Referring now more specifically to FIG. 1 of the drawings, there is shown a relaxation type frequency divider embodied as a synchronized blocking oscillator, which is suitable for use in the present invention. The circuit therein disclosed comprises an n-p-n transistor 110 having its collector electrode 112 and base electrode 113 connected, respectively, to the primary winding 122 and secondary winding 121 of a transformer . A second n-p-n transistor 130, whose collector-emitter path connects a negative source 129 to a resistance 105-capacitance 102 timing circuit, has its base electrode 133 inductively coupled to the primary winding 122.

The blocking oscillator circuit operates in a well known fashion. Initially, the plate of capacitor 102 adjacent to node 103 is at a negative potential sufficient to bias transistor 110 into a nonconducting condition. Assume for present purposes that a positive voltage is applied to the control input terminal 106.

The negative potential on the plate of capacitor 102, adjacent to node 103, discharges through the variable resistor 105. The duration of the cycle of operation of the blocking oscillator is set to some preselected value by presetting the variable resistor 105. A series of input pulses of frequency F is applied, via input terminal 101, to the capacitor 102. The capacitor 102 continues to discharge to the point where the sum of the instantaneous voltage level at node 103 comprising the sum of an input pulse and the potential on the negatively charged plate of the capacitor is at a sufficient threshold value to bias the transistor 110 into conduction.

With transistor 110 biased into its conducting region, current supplied by the source 128 begins to flow through the primary winding 122 of the coupling transformer 120. This initial current flow induces a voltage in the secondary winding 121 which tends to drive the base electrode 113 still more positive with respect to the emitter 111. As the base electrode becomes more positive, the transistor 110 is driven further into the conducting region.

This feedback action continues to drive the transistor 110 still further into the conducting region until its saturation level is reached. At the saturation level, current can no longer increase in the primary winding 122, and, hence, the field of the coupling transformer 120 collapses and a reverse or negative voltage is now induced in the secondary winding 121. This negative voltage drives the transistor 110 out of the conducting region and very rapidly biases it into the nonconducting condition.

The transistor 130, which is inductively coupled to the primary winding 122 by secondary winding 124, is biased into its conducting condition by the output pulse overshoot 126 caused by the aforementioned collapse of the field. With transistor 130 biased into its conducting state, the node 103 is clamped to the negative potential source 129. This negative potential to which node 103 is clamped is several times greater than the voltage that would be applied there by the ordinary back swing of a standard blocking oscillator. Accordingly, the short duration overshoot 126 illustrated in FIG. 1 temporarily drives transistor 130 into conduction and a resultant negative potential is once again applied to the plate of capacitor 102 adjacent node 103. The capacitor once again begins to discharge through the variable resistor 105 until a point is reached at which its potential combined with the voltage amplitude of an input pulse is sufficient to bias transistor 110 once again into conduction, and the cycle of operation then repeats.

The resistor 105 is variable (note, alternatively the capacitor 102 could be variable and the resistor 105 of constant value; this alternative will be readily apparent to those in the art) and hence by changing the resistance value the rate of discharge of capacitor 102 is changed. This provides the requisite control over the division ratio of the circuit. With the resistance at a low value, the division ratio will be low, i.e., the transistor 110 will be biased to conduction sooner; whereas, with a high resistance setting the capacitor discharges slowly and a greater number of input pulses will be applied before the aforementioned combined voltages are sufficient to drive transistor 110 into conduction. The prevailing design limits of the circuit shown in FIG. 1 will normally permit the generation of a division ratio of no greater than 11:1.

As a result of the aforementioned clamping provided via transistor 130, the voltage rise in the timing cycle of the discharge is much steeper than in the normal blocking oscillator operation. Consequently, the total amplitude difference between the triggering pulse and the pulse just preceding it is greater than would normally be achieved with the result that the next to last pulse is much less likely to falsely trigger the circuit.

The application of a negative voltage to the control input terminal 106 inhibits operation of the relaxation divider. Hence, the control input may be used to either enable or disable a counting or dividing action in this frequency divider circuit.

While the described relaxation type frequency divider circuit is advantageously suited for use in the cascaded frequency dividers constructed in accordance with the principles of the present invention, it will be apparent to those skilled in the art that other known frequency divider circuits can also be used to advantage; that is, the invention is in no way limited to the specific relaxation type circuit illustrated in FIG. 1. It should be further apparent that p-n-p transistors could be readily substituted for the n-p-n transistors of FIG. 1 if the obvious and well known changes in the polarity of sources et cetera are made.

Figure 2:
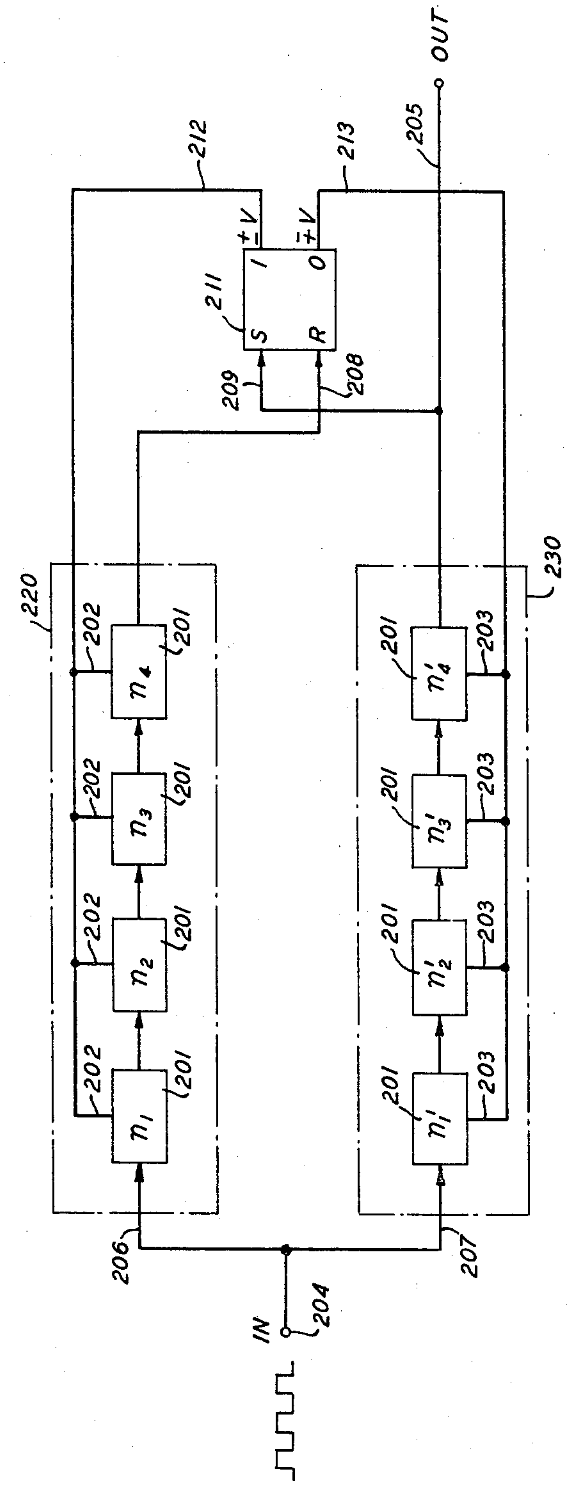
FIG. 2 is a schematic block diagram of an embodiment of the present invention.

In FIG. 2 a plurality of relaxation type frequency divider circuits 201, such as that described in FIG. 1, are interconnected into two separate chains of cascaded frequency dividers 220 and 230. The input pulses, of frequency F, applied to input terminal 204 are delivered simultaneously to each of the chains. The outputs of these chains are respectively applied to the set and reset alternate inputs of the memory device 211. This memory device may in this instance comprise a conventional flip-flop or bistable multivibrator.

The alternate "1" and "0" outputs 212 and 213 of the flip-flop are applied, respectively, to the control inputs 202 and 203 of the individual frequency dividers 201 in each of the chains of cascaded dividers. Signals to selectively enable or disable the operation of the frequency divider chains 220 and 230 are provided by the flip-flop. The enabling of the relaxation circuits of a frequency divider chain is accomplished in response to one polarity of the signal (i.e., a positive voltage). The opposite polarity (i.e., negative voltage) is used to disable the relaxation circuits of a cascaded chain. The output of the flip-flop consists of a pair of signals of opposite polarity, consequently, one of the chains of cascaded dividers will always be disabled when the other chain is enabled.

The train of pulses, whose frequency is to be divided, is applied to the input terminal 204 and from thence, via leads 206 and 207, to the individual chains of cascaded dividers 220 and 230. The over-all frequency division ratios of the chains 220 and 230 are $N_1$ and $N_2$, respectively. These division ratios represent the product of the individual division ratios of the individual frequency dividers 201 in each of the chains (e.g., $N_1=n_1 \cdot n_2 \cdot n_3 \cdot n_4$ and $N_2=n_1' \cdot n_2' \cdot n_3' \cdot n_4'$). It is to be understood that it is not necessary that chains of cascaded dividers be used; a single frequency divider circuit may be used to replace one of the chains if it is desired to add an integer in the sum to generate an arbitrary division ratio.

Assume, for illustrative purposes, that the flip-flop is in a state such that a signal of negative polarity is applied to the control inputs 203 disabling the chain of cascaded dividers 230 and a signal of positive polarity is applied to the control inputs 202 to enable the operation of the chain of cascaded dividers 220. Accordingly, the count or division proceeds in the cascaded chain 220. The division ratio of this chain is equal to the product of the division ratios of the divider circuits that comprise the chain, i.e., the over-all division of this chain is $N_1$, where $$N_1=n_1 \cdot n_2 \cdot n_3 \cdot n_4$$

The output pulse of the last frequency divider circuit in the first chain 220 is applied, via lead 208, to the reset terminal of the flip-flop. This output pulse thus initiates an action in the flip-flop so as to change its state, i.e., the flip-flop is now in its reset state and a negative potential appears at the "1" output thereof while a positive potential appears a the "0" output. Thus, the relaxation circuits of the cascaded chain 230 are now enabled and the relaxation circuits of chain 220 are disabled.

The chain 230 functions in the same manner as the chain 220. The output pulse of the chain 230 represents a further division of the input pulse train by a factor of $N_2$, where $N_2=n_1'\cdot n_2'\cdot n_3'\cdot n_4'$.

The pulse output of the chain of cascaded dividers 230 is applied via lead 209, to the set terminal of flip-flop 211 which in response thereto reverses the polarity of the existing control signals to again enable the operation of chain 220. This pulse also represents the output pulse and it is applied to lead 205 where other equipment to be operated may be connected.

The over-all frequency division ratio K is the sum $(N_1+N_2)$ of each of the frequency division ratios $N_1$ and $N_2$ of the individual chains of cascaded dividers 220 and 230. In summary, each of the chains of cascaded dividers is permitted to operate successively and produce a division ratio of $N_1$ and $N_2$. Since each chain of cascaded dividers is operated successively in sequence, the over-all division ratio K is the sum of the individual division ratios of each chain of cascaded dividers.

The cascaded chains of frequency dividers as shown in FIG. 2 comprise the same number of relaxation type circuits. It should be clear, however, that this is not necessary and in most applications the likelihood is that these cascaded chains would, in fact, comprise different numbers of relaxation circuits. Also, the division ratios of the chains need bear no relationship to each other. The only requirement in this regard is that the desired over-all divisor be achieved. For purposes of illustration, assume a division ratio of 103 is desired. To this end, the cascaded chain 220 may consist of two relaxation circuits providing division ratios of 10 and 10, respectively, for an over-all division ratio of 100. The chain 230 in this instance would comprise a single relaxation type frequency divider circuit which is set so as to provide a factor of 3:1. Thus an over-all division ratio of 100+3, or 103, will be achieved. It should be apparent from this illustration that any arbitrary divisor can be arrived at.

Figure 3:
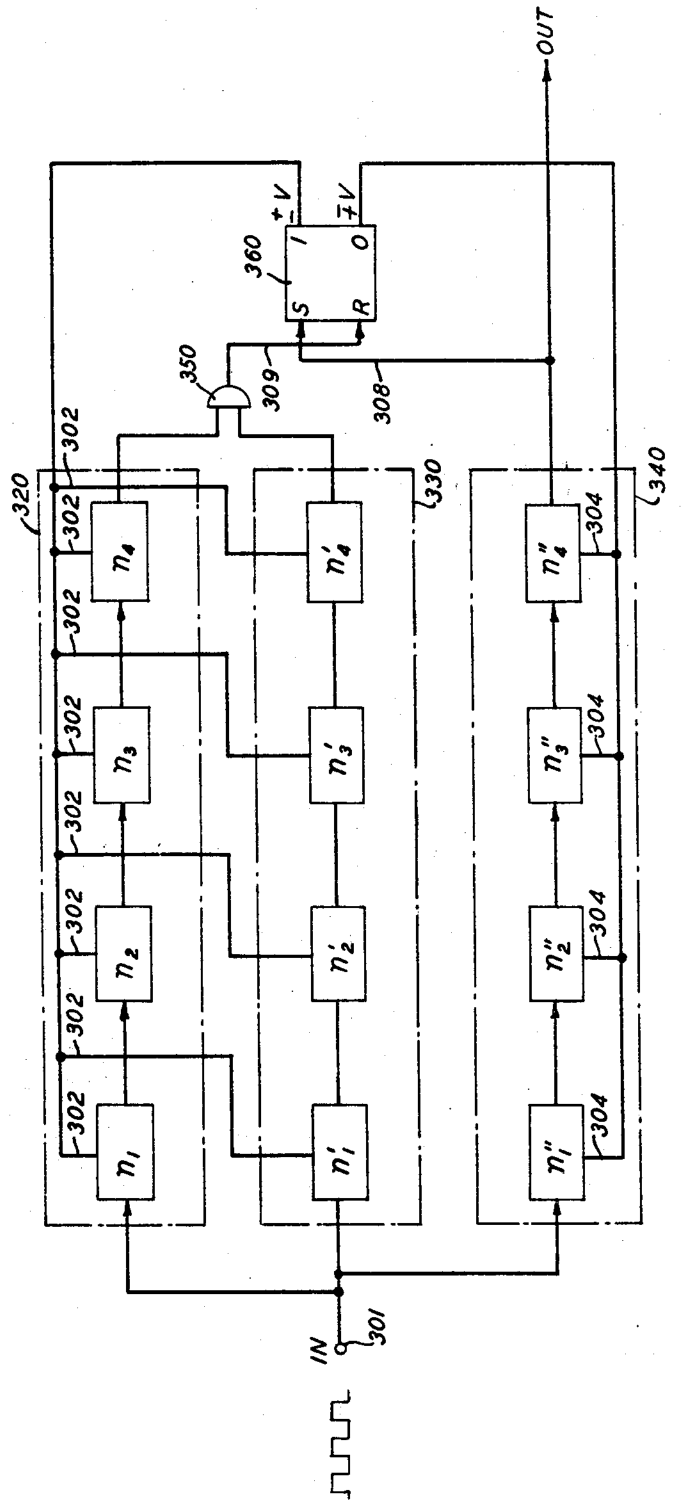
FIG. 3 is a schematic block diagram of a modified embodiment of the invention.

Referring now to FIG. 3, a modification of the circuit of FIG. 2 is illustrated therein. To secure a larger over-all division ratio, one of the chains of cascaded dividers is modified to form two separate chains of cascaded dividers, i.e., 320 and 330. The three chains of cascaded dividers 320, 330, and 340 are connected to the triggering pulse input terminal 301. Two of the chains of cascaded dividers, 320 and 330, are simultaneously and similarly controlled by signals applied to the control inputs of their respective dividers and are selected to have the division ratios $N_1$ and $N_2$, wherein $N_1$ and $N_2$ have no common factors. The two ratios $N_1$ and $N_2$ are comprised of the factors of the individual dividers wherein $N_1=n_1\cdot n_2\cdot n_3\cdot n_4$ and $N_2=n_1'\cdot n_2'\cdot n_3'\cdot n_4'$.

Assume for illustrative purposes that the chain of cascaded dividers 340 is currently disabled. A triggering pulse applied to terminal 301 initiates a synchronized dividing action in both the chains of cascaded dividers 320 and 330 under the control of the same pulse train. Since the outputs of these two chains of cascaded dividers are applied to a coincidence circuit 350, an output signal therefrom will not be applied to the reset terminal 309 of flip-flop 360 until the pulse outputs of both the chains 320 and 330 coincide. Now if their respective division ratios $N_1$ and $N_2$ are not factorable, the division ratio, at which the outputs do coincide, is equal to the product of the individual division ratios $N_1$ and $N_2$.

The coincident pulse output of the two chains 320 and 330, having an over-all division ratio of $N_1\cdot N_2$, permits the coincidence circuit 350 to apply a pulse to the flip-flop reset terminal 309. In response to this pulse the flip-flop reverses its state and this disables the two chains 320 and 330 by applying a negative signal, via leads 302, to each of the dividing circuits. An enabling signal is now applied, via control input leads 304, to enable the operation of the chain of cascaded dividers 340.

The chain of cascaded dividers 340 in response to the input pulse train divides the frequency thereof, in the previously described manner, by the division ratio $N_3$, where $N_3=n_1''\cdot n_2''\cdot n_3''\cdot n_4''$. The output pulse eventually derived from this chain is applied to the flip-flop 350, via lead 308, and causes it to shift and thus permits the cycle of operation to repeat. In this manner the over-all division ratio K can be seen to be the sum of the product of the division ratios of the first two cascaded chains 320 and 330 $(N_1\cdot N_2)$ and the division ratio of the third array 340, $N_3$, which may be expressed as $(N_1\cdot N_2+N_3)$. Here again, the cascaded chains need not comprise the same number of relaxation stages nor need the division ratios of the stages of the respective chains bear any relationship to each other. The only requirement is that the desired over-all division be arrived at.

Figure 4:
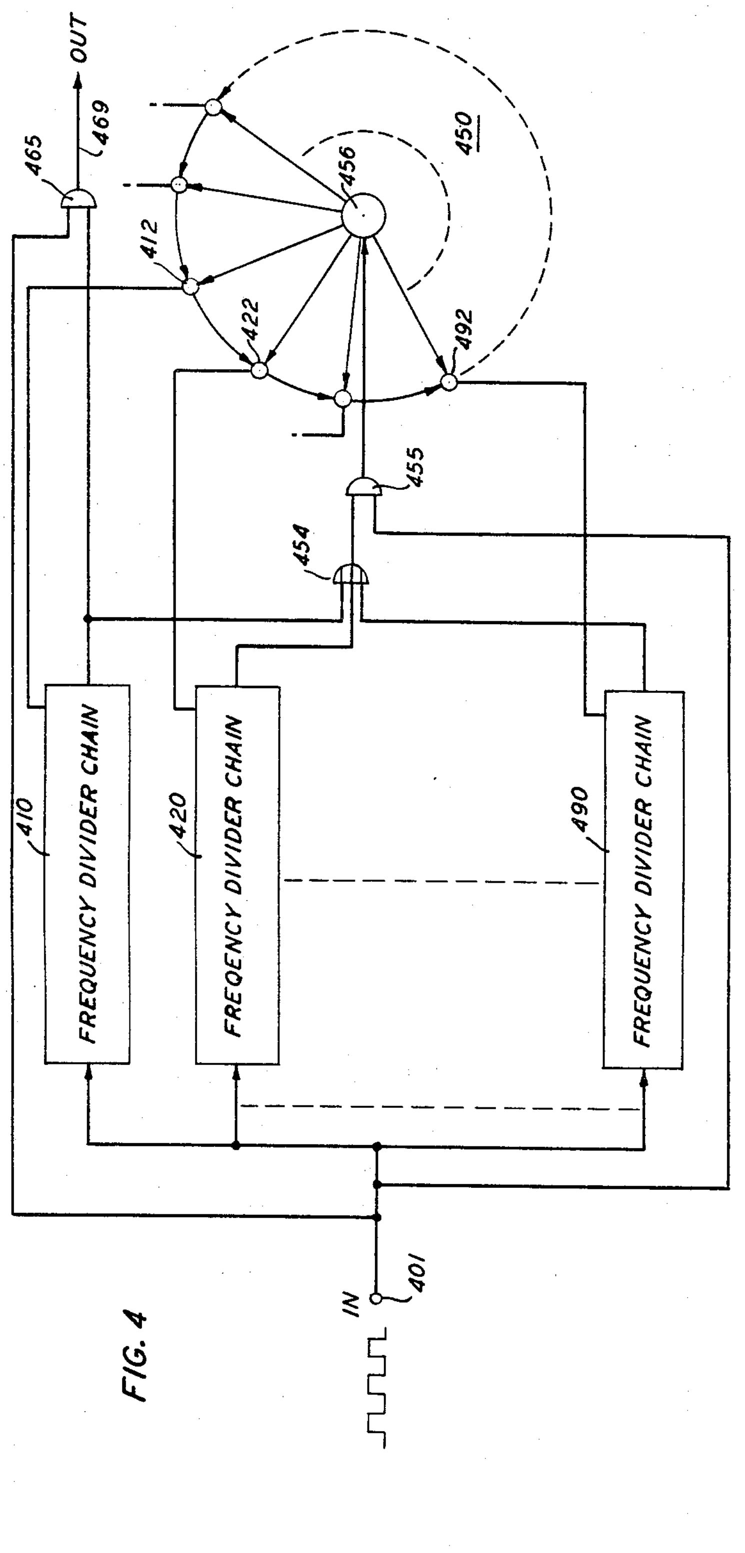
FIG. 4 is a schematic block diagram of a generalized version of the present invention.

A more generalized embodiment of the present invention is shown in FIG. 4 wherein a large plurality of chains of cascaded relaxation type frequency dividers 410, 420 . . . 490 are summed by enabling their operation singly and in sequence by a multistate memory device 450. Such memory circuit may comprise a shift register or some other suitable circuit known in the art.

It is assumed for illustrative purposes that the chain of cascaded frequency dividers 420 is in its operating or enabled condition. The remaining chains of cascaded dividers are thus disabled.

The multistate memory device 450 shown symbolically in FIG. 4 of the drawings may comprise any conventional shift register, preferably of the recirculating type. The shift register would comprise a number of stages equal to the number of cascaded chains of frequency dividers. As the recirculating bit is shifted or advanced to each stage of the register, the cascaded chain connected to the output of that stage would be enabled, while all the other cascaded chains remain disabled. Accordingly, as the recirculating bit is shifted to successive stages, successive cascaded chains are enabled in sequences.

The pulse train applied to the input terminal 401 thus initiates the dividing action in the chain 420, since it is assumed enabled. At the completion of this division, the last divider of chain 420 applies an enabling signal, via the OR gate 454, to the coincidence gate 455. This permits the input triggering pulse to be coupled to the shifter control 456 of the multistate memory device 450. This causes the enabling output signal of device 450 to advance one stage and activate the next successive chain of cascaded dividers. As each chain of the cascaded frequency dividers completes its division, its output pulse applied through OR gate 454 enables a triggering pulse, via the coincidence circuit 455, to activate the shifter control 456 to thereby enable the next succeeding chain of cascaded frequency dividers. An output pulse derived from the output of one of the cascaded chains is applied to the coincidence gate 465 so as to permit the transmittal of a triggering pulse to the output lead 469. It should be apparent that the over-all frequency dividing ratio is equal to the sum of the ratios of each of the chains.

It can be seen from the above description that many varied modifications may be made to the present invention without departing from the spirit and scope thereof. For instance, it may be desirable to parallel two frequency dividers such as are disclosed in FIG. 2 and to achieve a double summing operation by alternately inhibiting the action of the two bistable circuits, which in turn alternately inhibits the operation of their own respective chains of cascaded dividers. Numerous other modifications which do not depart from the spirit and scope of the invention will be obvious to those skilled in the art.

What is claimed is:

1. In combination, a first chain of cascaded relaxation type frequency dividers with an over-all divisor ratio of $N_1$ including controlling means in each relaxation type frequency divider to inhibit the timing cycle therein in response to a selected polarity of a control input signal and to energize the timing cycle of said relaxation type frequency dividers with an opposite polarity control input signal, a second chain of cascaded relaxation type frequency dividers with an over-all divisor ratio of $N_2$ including controlling means in each relaxation type frequency divider to inhibit the timing cycle therein in response to a selected polarity of a control input signal and to energize the timing cycle of said relaxation type frequency dividers with an opposite polarity control input signal, a source of synchronizing pulses of periodic rate F, means to apply said synchronizing pulses to each of said first and second chains of relaxation type frequency dividers, a memory circuit having two stable states including a first and a second input terminal and a first and a second output terminal from which said control input signals are derived, means to apply the output of said first chain of cascaded relaxation type frequency dividers to said first input terminal of said memory circuit, means to apply the output of said second chain of cascaded relaxation type frequency dividers to said second input terminal of said memory circuit, means to couple said first output terminal of said memory circuit to the controlling means included in said first chain of said cascaded relaxation type frequency dividers to selectively energize and inhibit the timing action of the individual relaxation type frequency dividers in said first chain, means to couple said second output terminal of said memory circuit to the controlling means included in said second chain of cascaded relaxation type frequency dividers to selectively energize and inhibit the timing action of the individual relaxation type frequency dividers in said second chain, said first and second chains of cascaded relaxation type frequency dividers alternately numerically dividing said synchronizing pulses of periodic rate F by successive factors of $N_1$ and $N_2$, and output means to utilize the output pulse of a selected one of said first and second chains of relaxation type frequency dividers, the periodic output rate being $$\frac{F}{(N_1+N_2)}$$

2. The combination as set forth in claim 1 wherein said relaxation type frequency divider comprises a first transistor including a base, an emitter, and a collector electrode and having its collector electrode inductively coupled to its base electrode, a second transistor including a base, an emitter, and a collector electrode and having its base electrode inductively coupled to the collector electrode of said first transistor, a timing capacitor coupled to the base of said first transistor, said second transistor having its collector-emitter path connecting a potential source to said timing capacitor, said second transistor biased by the output of said first transistor to conduct and apply said potential to said timing capacitor and said controlling means including means to apply energizing and inhibiting control input signals to a junction common to said timing capacitor and the base electrode of said first transistor so as to respectively enable and disable timing action therein.

3. A frequency divider to reduce the frequency of pulse signals comprising in combination, a first cascaded chain of pulse synchronized relaxation oscillators, a second cascaded chain of pulse synchronized relaxation oscillators, each of said relaxation oscillators including a timing circuit and a timing circuit control means to energize and inhibit timing action therein, means to apply said pulse signals to the initial relaxation oscillator of each of said first and second cascaded chains of relaxation oscillators, a bistable multivibrator including a set and a reset input terminal and a corresponding output terminal for each of said input terminals, said output terminals each alternately supplying two control signals of opposite polarity designated energizing and inhibiting signals, respectively, in response to state changes of said bistable multivibrator, means to apply the output of the final relaxation oscillator of said first cascaded chain of relaxation oscillators to said set input terminal of said bistable multivibrator, means to apply the output of the final relaxation oscillator of said second cascaded chain of relaxation oscillators to said reset input terminal of said bistable multivibrator, means to couple the output terminal of said bistable multivibrator corresponding to said reset input terminal to said timing circuit control means of said relaxation oscillators of said first cascaded chain of relaxation oscillators, means to couple the output terminal of said bistable multivibrator corresponding to said set input terminal to said timing circuit control means of said relaxation oscillators of said second cascaded chain of relaxation oscillators, whereby the two simultaneous respective control signals supplied by the two output terminals of the bistable multivibrator energizes the timing circuits of the relaxation oscillators of one of said first and second cascaded chains of relaxation oscillators to count in response to input pulses and simultaneously inhibits the timing circuits of the relaxation oscillators of the other one of said first and second cascaded chains of relaxation oscillators to prevent counting action therein.

4. In combination a first chain of cascaded frequency dividers, a second chain of cascaded frequency dividers, said individual frequency dividers in each of said first and second chains including a control signal input means to receive control signals to energize and inhibit dividing action therein, a source of pulse signals, means to apply said pulse signals to said first and second chains of cascaded frequency dividers, a bistable control circuit having first and second input terminals and first and second output terminals, said first and second output terminals supplying control signals in response to switching action induced by pulse signals applied to said first and second input terminals, means to couple the output pulse signals of each of said first and second chains of cascaded frequency dividers to said first and second input terminals of said bistable control circuit, respectively, means to couple the said first output terminal to the control signal input means of said frequency dividers of said first chain to utilize said control signals to energize and inhibit dividing action in each of said frequency dividers in said first chain, and means to couple said second output terminal to said control signal input means of said frequency dividers of said second chain to utilize said control signals to energize and inhibit dividing action in each of said frequency dividers in said second chain.

References Cited

UNITED STATES PATENTS

| | | | |
|---|---|---|---|
| 2,602,140 | 7/1952 | Fink | 328—40 X |
| 3,096,483 | 7/1963 | Ransom | 328—48 |
| 3,108,198 | 11/1964 | Lentz | 328—40 X |
| 3,158,751 | 8/1965 | Nelson | 307—88.5 |
| 3,200,261 | 11/1966 | Fischman et al. | 307—88.5 |
| 3,283,131 | 11/1966 | Carbrey. | |

ARTHUR GAUSS, *Primary Examiner.*

S. D. MILLER, *Assistant Examiner.*